3,793,451
Patented Feb. 19, 1974

3,793,451
INSECTICIDAL PYRIDYLAMINIDINOUREAS
William D. Dixon, Kirkwood, Mo., assignor to Monsanto Company, St. Louis, Mo.
No Drawing. Original application Nov. 5, 1970, Ser. No. 87,332, now Patent No. 3,699,110. Divided and this application June 9, 1972, Ser. No. 261,179
Int. Cl. A01n 9/22
U.S. Cl. 424—263                    20 Claims

ABSTRACT OF THE DISCLOSURE

This invention relates to new and useful pyridylaminidinoureas and to insecticidal compositions containing at least one of them and also to insecticidal methods employing at least one of these new pyridine derivatives. The compounds of this invention are to be represented by the formula

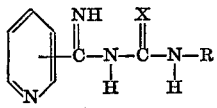

wherein X is oxygen or sulfur and R is alkyl having from 1 through 8 carbon atoms, alkenyl having from 3 through 6 carbon atoms, cycloalkyl having from 3 through 6 carbon atoms, phenyl or benzyl.

---

This is a division, of application Ser. No. 87,332, filed Nov. 5, 1970 now U.S. Pat. No. 3,699,110.

This invention relates to new and useful pyridylaminidinoureas and to insecticidal compositions containing at least one of them and also to insecticidal methods employing at least one of these new pyridine derivatives. The compounds of this invention is to be represented by the formula

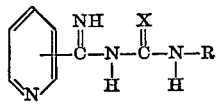

wherein X is oxygen or sulfur and R is alkyl having from 1 through 8 carbon atoms, alkenyl having from 3 through 6 carbon atoms, cycloalkyl having from 3 through 6 carbon atoms, phenyl or benzyl. The terms "benzyl" and "phenyl" include substituted and unsubstituted aryl groups. Representative ring substituents are halo, nitro, trichloromethyl, methyl and the like.

The alkyl group in these compounds can be methyl, ethyl, normal propyl, isopropyl, normal butyl, secondary butyl, tertiary butyl, normal pentyl, isopentyl and the various forms of hexyl, heptyl and octyl.

The compounds of the present invention can be readily prepared by the reaction of a pyridylamidine hydrochloride with a substantially equimolar portion of an appropriately substituted isocyanate or isothiocyanate in a suitable solvent and in the presence of triethylamine. Suitable solvents include chloroform, acetonitrile, tetrahydrofuran and the like. The reaction which is exothermic is most conveniently conducted at room temperature but can be carried out at any temperature up to the boiling point of the solvent. The pyridylamidine hydrochloride used as a starting material in the reaction is obtained in a conventional manner by the addition reaction of a cyanopyridine with methanol to provide the corresponding imidate which is then converted to the amidine hydrochloride salt by treatment with ammonium chloride. The preparation of the compounds of this invention is illustrated by the following examples. In these examples and throughout the specification all proportions are expressed in parts by weight unless otherwise designated.

EXAMPLE 1

1-(3,4-dichlorophenyl)-3-(2-pyridylformimidoyl)-2-thiourea

About 160 parts of nicotinamidine hydrochloride, 100 parts of triethylamine and 2,000 parts chloroform were stirred together in a suitable reaction vessel equipped with a condenser and a thermometer. About 200 parts of 3,4-dichlorophenylisothiocyanate were then added and agitation was continued until completion of the reaction. Since the reaction is exothermic the temperature of the reaction medium increased to about 35° C. from an initial temperature of approximately 20° C. The product was obtained in the form of a yellow precipitate which was removed from the reaction medium by filtration, and recrystallized from acetone. The compound had a melting point of 184–185° C. and gave the following analysis:

Calc'd for $C_{13}H_{10}Cl_2N_4S$ (percent): C, 48.01; H, 3.10; N, 17.23. Found (percent): C, 48.01; H, 3.06; N, 17.35.

EXAMPLE 2

In substantially the same manner, about 160 parts of pyridylamidine hydrochloride were reacted with 60 parts of methylisocyanate to provide 1-methyl-3-picolinimidoylurea which when recrystallized from ethanol has a melting point of 88–91° C. Upon analysis of this product, the following results were obtained:

Calc'd for $C_8H_{10}N_4O$ (percent): C, 53.92; H, 5.66; N, 31.44. Found (percent): C, 53.81; H, 5.57; N, 31.29.

Other compounds of the present invention that were prepared in substantially the same manner using properly substituted reactants include:

| | M.P., ° C. |
|---|---|
| 1-(3,4-dichlorophenyl)-3-(2-pyridylformimidoyl)urea | 156–158 |
| 1-(4-chlorophenyl)-3-(2-pyridylformimidoyl)urea | 158–161 |
| 1-butyl-3-picolinimidoylurea | 70–71.5 |
| 1-methyl-3-picolinimidoylthiourea | 86–89 |
| 1-(p-nitrophenyl)-3-picolinimidoylthiourea | 195–196 |
| 1-butyl-3-picolinimidoylthiourea | 50–51.5 |
| 1-ethyl-3-picolinimidoylthiourea | 56.5–59 |
| 1-(tert-butyl)-3-picolinimidoylthiourea | 137.5–140.5 |
| 1-heptyl-3-picolinimidoylthiourea | 57–60 |
| 1-allyl-3-picolinimidoylthiourea | 49–52 |
| 1-(m-bromophenyl)-3-picolinimidoylthiourea | 145–147 |
| 1-(p-bromophenyl)-3-picolinimidoylthiourea | 170–171 |
| 1-(6-tert-butyl-o-tolyl)-3-picolinimidoylthiourea | 139.5–141.5 |
| 1-(m-chlorophenyl)-3-picolinimidoylthiourea | 145.5–147.5 |
| 1-(p-chlorophenyl)-3-picolinimidoylthiourea | 160–161 |
| 1-(3,4-dichlorobenzyl)-3-picolinimidoylthiourea | 124–127 |
| 1-picolinimidoyl-3-(p-tolyl)thiourea | 132–134 |
| 1-picolinimidoyl-3-(α,α,α-trifluoro-o-tolyl)-2-thiourea | 113–116 |
| Do | 145–147 |
| 1-phenyl-3-picolinimidoylurea | 135–136 |
| 1-picolinimidoyl-3-p-tolylurea | 129-131 |
| 1-phenyl-3-picolinimidoylthiourea | 125–137 |
| 1-(4-chlorophenyl)-3-(3-pyridylformimidoyl)urea | 189–191 |
| 1-(3,4-dichlorophenyl)-3-(3-pyridylformimidoyl)urea | 187–189 |
| 1-(p-tolyl)-3-(3-pyridylformimidoyl)urea | 178–180 |
| 1-phenyl-3-(3-pyridylformimidoyl)-2-thiourea | 127–129 |
| 1-(3,4-dichlorophenyl)-3-(3-pyridylformimidoyl)-2-thiourea | 178–180 |
| 1-methyl-3-nicotinimidoyl-2-thiourea | 138–140 |
| 1-butyl-3-(3-pyridylformimidoyl)-2-thiourea | 85–87 |
| 1-ethyl-3-nicotinimidoylthiourea | 113–117 |
| 1-nicotinimidoyl-3-(p-nitrophenyl)thiourea | 261–265 |
| 1-heptyl-3-nicotinimidoylthiourea | 52–55 |
| 1-cyclohexyl-3-nicotinimidoylthiourea | 160–161.5 |
| 1-(m-bromophenyl)-3-nicotinimidoylthiourea | 154.5–157 |
| 1-(p-bromophenyl)-3-nicotinimidoylthiourea | 181–182.5 |
| 1-nicotinimidoyl-3-p-tolylthiourea | 159–161 |
| 1-(3,4-dichlorobenzyl)-3-nicotinimidoylthiourea | 157.5–160 |
| 1-nicotinimidoyl-3-(α,α,α-trifluoro-o-tolyl)-2-thiourea | 165–166 |
| 1-(3-butoxypropyl)-3-nicotinimidoylthiourea | (¹) |
| 1-nicotinimidoyl-3-phenylurea | 168–169 |
| 1-butyl-3-nicotinimidoylurea | 99–102 |
| 1-methyl-3-nicotinimidoylurea | 151–154 |
| 1-isonicotinimidoyl-3-methylthiourea | 136–138.5 |
| 1-isonicotinimidoyl-3-phenylthiourea | 162–164 |
| 1-butyl-3-isonicotinimidoylurea | 88–92 |
| 1-isonicotinimidoyl-3-p-tolylurea | 175–177 |
| 1-(3,4-dichlorophenyl)-3-isonicotinimidoyl-2-thiourea | 195–196.5 |
| 1-isonicotinimidoyl-3-methylurea | 183–185 |

¹ No B.P. listed.

The terms "insect" and "insecticide" are used herein in their broad common usage to include spiders, mites, ticks, and like pests which are not in the strict biological sense classed as insects. Thus, the term "insect" is used to refer not only to those small invertebrate animals belonging mostly to the class Insecta, comprising six-legged, usually winged forms, as bettles, bugs, bees, flies, and so forth, but also to other allied classes of arthropods whose members are wingless and usually have more than six legs, as spiders, mites, ticks, centipedes, millipedes, and wood lice.

In order to demonstrate the utility of the compounds of this invention against western corn rootworm larvae (Diabrotica virgifera) 1 - phenyl - 3 - picolinimidoylthiourea was incorporated into soil containing corn root segments and the soil was infested with western corn rootworm larvae. The soil was then maintained for 48 hours at 25° C. and the larval mortality determined. A 100% mortality rate was obtained with soil containing 6 p.p.m. of this compound.

In order to illustrate the activity of the present compounds against the southern corn rootworm, the following procedure was followed:

To a growth pouch (diSPo Seed-Pak growth pouch, Catalogue No. B1220, of Scientific Products Division of American Hospital Supply Corporation, Evanston, Ill.) in an upright position is added 20 ml. of distilled water. Thereafter is added 0.1 ml. of an acetone solution of known concentration in percent by weight of a compound of this invention (for example a 0.1 ml. of a 0.1% by weight acetone solution of the compound provides a concentration of 5.0 p.p.m. thereof). In the trough of the pouch formed by the paper wick thereof are placed two corn seeds (Zea mays, Hybrid U.S. 13) about one inch apart. Thereupon to the trough and between the seeds is added 8 to 12 ready-to-hatch eggs of the southern corn rootworm (Diabrotica undecimpunctata howardi) which eggs were washed (with distilled water) free of the soil in which they were incubated at room temperature for 21 days immediately prior to their placement in the trough. The so-charged growth pouch is then placed in an upright position in an incubator maintained at 80° F. and 70% relative humidity for 14 days. Immediately thereafter the growth pouches are removed and the extent of kill in percent of the corn rootworm larvae observed. At a concentration of 5 p.p.m., a 100% kill was observed with 1-phenyl-3-picolinimidoylthiourea and at the same concentration a 60% mortality rate was obtained with 1 - (p - tolyl) - 3 - (3-pyridylformimidoyl)urea.

As shown below the compounds of this invention are also effective in combatting mosquitoes.

A base solution of the compound to be evaluated is prepared by dissolving 1.0 gram thereof in sufficient acetone to provide a 0.10% by weight solution thereof. Then 0.10 ml. of this actone solution is pipetted into a 25 x 200 mm. culture tube cointaining sufficient distilled water to provide a concentration of 2 p.p.m. of the compound. The tube is stoppered and shaken vigorously to facilitate complete mixing of its contents. Thereupon approximately 25 early instar yellow fever mosquito larvae (Aedes aegypti) are transferred to the tube with the aid of a pipette. The larvae are then held in the tube at 25° C. for seven days, at the end of which time mortality observations are taken. At a concentration of 2 p.p.m., 100% kills were obtained with 1 - nicotinimidoyl - 3 - p - tolylthiourea, 1-(3,4-dichlorobenzyl) - 3 - nicotinimidoylthiourea, 1 - (p - chlorophenyl) - 3 - picolinimidoylthiourea and with 1-(3,4-dichlorobenzyl) - 3 - picolinimidoylthiourea.

The term "dispersed" is used herein in its widest possible sense. Particles of the compounds may be molecular in size and held in true solution in a suitable organic solvent, or the particles may be colloidal in size and distributed throughout a liquid phase in the form of suspensions or emulsions, or in the form of particles held in suspensions by wetting agents. The term includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulare form, e.g. pellets, granules, powders, or dusts. The term "dispersed" also includes mixtures which are suitable for use as aerosols including solutions, suspensions, or emulsions of the compounds of the invention in a carrier such as dichloro-difluoromethane and the like which boil below room temperature at atmospheric pressure.

The expression "extending agent" as used herein includes insecticidal adjuvants and any and all of the substances in which the compounds of this invention are dispersed. It includes, therefore, the solvents of a true solution, the liquid phase of suspensions, emulsions or aerosols, the semi-solid carrier of ointments and the solid phase of particulate solids, e.g., pellets, granules, dusts and powders.

The exact concentration of the compounds of this invention employed in combatting or controlling insects pests can vary considerably provided the required dosage (i.e., toxic or lethal amount) thereof is supplied to the pests or to the environment of the pests. When the extending agent is a liquid or mixture of liquids (e.g., as in solutions, suspensions, emulsions, or aerosols) the concentration of the active compound employed to supply the desired dosage generally will be in the range of 0.0001 to 50 percent by weight. When the extending agent is a semi-solid or solid, the concentration of the insecticide employed to supply the desired dosage generally will be in the range of 0.1 to 75 percent by weight. From a practical point of view, the manufacturer must supply the user with a concentrate in such form that, by merely mixing with water or solid extender (e.g., powdered clay or talc) or other low-cost material available to the user at the point of use, he will have an easily prepared insecticidal spray or particulate solid. In such a concentrate composition, the insecticide generally will be present in a concentration of 5 to 95 percent by weight, the residue being any one or more of the well-known insecticidal adjuvants, such as the various surface active agents (e.g., detergents, a soap or other emulsifying or wetting agent), surface-active clays, solvents, diluents, carrier media, adhesives, spreading agents, humectants, and the like.

The are a large number of organic liquids which can be used alone or in combination for the preparation of solutions, suspensions or emulsions of the compounds of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petrolum fractions (e.g. those boiling almost entirely under 400° F. at atmospheric pressure and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion thereof can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like.

The insecticides of this invention can be supplied to the insect pests or to the environment of the insect pests in the form of emulsions or suspensions. Emulsions or suspensions are prepared by dispersing the compounds either per se or in the form of an organic solution thereof in water with the aid of a water-soluble surfactant. The term "surfactant" as employed herein is as used in volume II of Schwartz, Perry and Berch's "Surface Active Agents and Detergents" (1958, Interscience Publishers, Inc., New York) in place of the expression "emulsifying agent" to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, p. 280). These surfactants include the well-known capillary-active substances which may be anionic, cationic, or nonionic which are described in detail in volumes I and II of Schwartz, Perry and Berch's "Surface Active Agents and Detergents" (1958, Interscience Publishers, Inc., New York) and also in the November 1947 issue of Chemical Industries (pp. 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants are incorporated in this specification by reference in order to avoid unnecessary enlargement of this specification. The preferred surfactants are the water-soluble anionic nonionic surface-active agents set forth in U.S. Pat. 2,846,398 (issued Aug. 5, 1958). In general, a mixture of water-soluble anionic and water-soluble nonionic surfactants is preferred.

The compounds of this invention can be dispersed by suitable methods (e.g. tumbling or grinding) in solid extending agents either of organic or inorganic nature and supplied to the insect pests' environment in particulate form. Such solid materials, include for example, tricalcium phosphate, calcium carbonate, kaolin, bole, kieselguhr, talc, bentonite, attapulgite, fuller's earth, pyrophillite, diatomaceous earth, calcined magnesia, volcanic ash, sulfur and the like inorganic solid materials as well as organic materials such as powdered cork, corn husks, corn cobs, powdered wood, and powdered walnut shells. The preferred solid carriers are the adsorbent clays, e.g., diatomaceous earth. These mixtures can be used for insecticidal purposes in the dry form, or by addition of water-soluble surfactants or wetting agents the dry particulate solids can be rendered wettable by water so as to obtain stable aqueous dispersions or suspensions suitable for use as sprays. When used in the dry form, the preferred carrier is diatomaceous earth, and the concentration of the present pesticides on this carrier is normally between about 10 and 50% by weight of the total composition. For most practical purposes, the concentration is normally maintained between about 20 and 30%. A typical composition contains about 25% of a pesticide of the present invention and about 75% diatomaceous earth.

For special purposes the compounds of this invention can be dispersed in a semi-solid extending agent such as petroleum or soap (e.g. sodium stearate or oleate or palmitate or mixtures thereof) with or without the aid of solubility promoters and/or surfactants or dispersing agents.

In all of the forms described above, the dispersions can be provided ready for use in combatting insect pests or they can be provided in a concentrated form suitable for mixing with or dispersing in other extending agents. As illustrative of a particularly useful concentrate is an intimate mixture of a compound of this invention with a water-soluble surfactant in the weight proportions of 0.1 to 15 parts of surfactant with sufficient sulfinate to make 100 parts by weight. Such a concentrate is particularly adapted to be made into a spray for combatting the insect pests by the addition of water thereto.

Another useful concentrate adapted to be made into a spray for combatting a variety of insect pests is a solution (preferably as concentrated as possible) of a compound of this invention in an organic solvent therefor. The said liquid concentrate preferably contains dissolved therein a minor amount (e.g. 0.5 to 10 percent by weight of the weight of the new insecticidal agent) of a water-soluble surfactant (or emulsifying agent).

Of the surfactants aforementioned in preparing the various emulsifiable, wettable or dispersible compositions or concentrates of this invention, the anionic and nonionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the nonionic surfactants, the particularly preferred are the water-soluble polyoxyethylene derivatives of alkylphenols (particularly isooctylphenol) and the water-soluble polyoxyethylene derivatives of the mono-higher fatty acid esters of hexitol anhydrides (e.g. sorbitan). These materials in general contain 15 to 30 moles of ethylene oxide per mole of the hexitol anhydride or the alkylphenol.

The compositions of this invention can also contain other additaments such as fertilizers and pesticides used as, or in combination with, the carrier materials. For example, the insecticides useful in combination with the above-described compounds include parathion, methyl parathion, pyrethrine, nicotine, aldrin, chlordane, heptachlor, toxaphene, malathion, 2-isopropoxyphenyl N-methylcarbamate, O,O,O,O - tetramethyl O,O' - thiodo - p-phenylene phosphorothioate, dimethyl phosphate of 3-hydroxy-N-methyl-cis-crotonamide, fenthion, carbofuran, mirex, DDT, dicofol, methoxychlor, dichlorvos, demeton, dimethoate, carbophenothion, ronnel, carbaryl, azinphos-methyl, methomyl, aldicarb and the like.

In controlling or combatting insect pests the compounds of this invention either per se or compositions containing them are supplied to the insect pests or to their environment in a lethal or toxic amount. This can be done by dispersing the new insecticidal agent or insecticidal composition comprising same in, on or over agricultural soil or other growth media or other media infested with insect pests or attractable to the pests for habitational or sustenance or propagational purposes, in any conventional fashion which permits contact between the insect pests and the compounds of this invention. Such dispersing can be brought about by applying sprays, dips or particulate solid compositions to a surface infested with the insect pests or attractable to the pests. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish sub-surface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:

1. An insecticidal composition comprising an insecticidal adjuvant and an insecticidally effective amount of a compound of the formula

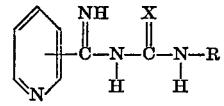

wherein X is oxygen or sulfur and R is alkyl having from 1 through 8 carbon atoms, alkenyl having from 3 through 6 carbon atoms, cycloalkyl having from 3 through 6 carbon atoms, phenyl or benzyl with the proviso that the floating radical is not attached to the 2 or 6 position when the term X represents sulfur and the term R represents unsubstituted phenyl.

2. The composition of claim 1 in which R is benzyl or phenyl.

3. The composition of claim 1 in which R is alkyl.

4. The composition of claim 1 in which R is benzyl or phenyl and X is sulfur.

5. The composition of claim 1 in which the compound is 1-phenyl-3-picolinimidoylthiourea.

6. The composition of claim 1 in which the compound is 1-(p-tolyl)-3-(3-pyridylformimidoyl)urea.

7. The composition of claim 1 in which the compound is 1-nicotinimidoyl-3-p-tolylthiourea.

8. The composition of claim 1 in which the compound is 1-(3,4-dichlorobenzyl)-3-nicotinimidoylthiourea.

9. The composition of claim 1 in which the compound is 1-(p-chlorophenyl)-3-picolinimidoylthiourea.

10. The composition of claim 1 in which the compound is 1-(3,4-dichlorobenzyl)-3-picolinimidoylthiourea.

11. A method of killing insects which comprises bringing into contact with the insects an insecticidally effective amount of a compound of the formula

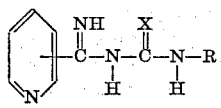

wherein X is oxygen or sulfur and R is alkyl having from 1 through 8 carbon atoms, alkenyl having from 3 through 6 carbon atoms, cycloalkyl having from 3 through 6 carbon atoms, phenyl or benzyl.

12. The method of claim 11 in which R is benzyl or phenyl.

13. The method of claim 11 in which R is alkyl.

14. The method of claim 11 in which R is benzyl or phenyl and X is sulfur.

15. The method of claim 11 in which the compound is 1-phenyl-3-picolinimidoylthiourea.

16. The method of claim 11 in which the compound is 1-(p-tolyl)-3-(3-pyridylformimidoyl)urea.

17. The method of claim 11 in which the compound is 1-nicotinimidoyl-3-p-tolylthiourea.

18. The method of claim 11 in which the compound is 1-(3,4-dichlorobenzyl)-3-nicotinimidoylthiourea.

19. The method of claim 11 in which the compound is 1-(p-chlorophenyl)-3-picolinimidoylthiourea.

20. The method of claim 11 in which the compound is 1-(3,4-dichlorobenzyl)-3-picolinimidoylthiourea.

References Cited

UNITED STATES PATENTS 3,699,110  10/1972  Dixon _____ 260—294.8 E

OTHER REFERENCES

Chemical Abstracts 52:13713H (1958).

ALBERT T. MEYERS, Primary Examiner

L. SCHENKMAN, Assistant Examiner

U.S. Cl. X.R.

424—266